United States Patent
Shih (10) Patent No.: US 9,104,380 B2
(45) Date of Patent: Aug. 11, 2015

(54) RATCHET MODULE AND ELECTRONIC APPARATUS HAVING THE SAME

(71) Applicant: Wistron Corporation, New Taipei (TW)

(72) Inventor: Syuan-He Shih, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 128 days.

(21) Appl. No.: 14/108,361

(22) Filed: Dec. 17, 2013

(65) Prior Publication Data
US 2015/0022970 A1    Jan. 22, 2015

(30) Foreign Application Priority Data
Jul. 18, 2013   (TW) .............................. 102125779 A (51) Int. Cl.
  *G06F 1/16*    (2006.01)
  *F16D 41/12*   (2006.01)
  *F16D 41/02*   (2006.01)

(52) U.S. Cl.
CPC .............. *G06F 1/1679* (2013.01); *F16D 41/02* (2013.01); *F16D 41/12* (2013.01)

(58) Field of Classification Search
USPC ......... 312/223.2, 334.46, 333, 271, 312, 215, 312/211, 223.1, 223.6, 34.12, 247, 213, 312/223.3; 81/60, 61, 57.39, 467, 468, 470, 81/129.5, 129; 361/679.58, 679.33, 361/679.34, 679.01, 679.28, 679.43, 361/679.32, 679.56, 679.47, 679.54, 361/679.55, 679.46, 679.49, 679.53; 360/78.04, 99.08, 261.3, 254.8, 99.15; 451/11, 49, 8, 5, 127, 7; 16/235, 362, 16/285, 305
See application file for complete search history.

(56) References Cited

U.S. PATENT DOCUMENTS

| 2010/0126783 | A1* | 5/2010 | Chen ............................. 177/239 |
| 2012/0302919 | A1* | 11/2012 | Robbins et al. ................ 600/583 |
| 2014/0014347 | A1* | 1/2014 | Adam et al. ............... 166/308.1 |

FOREIGN PATENT DOCUMENTS

TW    575133    2/2004

* cited by examiner

*Primary Examiner* — Hung Duong
(74) *Attorney, Agent, or Firm* — Winston Hsu; Scott Margo (57) ABSTRACT

A ratchet module disposed in an electronic apparatus realizes one-way push-push function for a functional module. The ratchet module includes a first member and a second member meshed with each other with axially extending ratchet such that the second member may be pushed to rotate in one direction with respect to the first member. A torque spring disposed between the two members is twisted to accumulate a restoring force as the second member is moved by the functional module sliding in a housing and rotated with respect to the first member. The second member is served to maintain the position of the functional module. A button is further used in the ratchet module to push the second member to disengage from the first member, allowing the twisted torque spring to rotate the second member automatically in a reverse direction that pushes the functional module to slide reversely in the housing.

22 Claims, 6 Drawing Sheets

RATCHET MODULE AND ELECTRONIC APPARATUS HAVING THE SAME

BACKGROUND OF THE INVENTION

1. Field of the Invention

The invention relates to a ratchet module, and more particularly, to a ratchet module used in an electronic apparatus for easy insertion and ejection of a functional module and the electronic apparatus having the same.

2. Description of the Prior Art

Push-push lock is commonly used as an insertion/ejection device for functional modules such as an optical disk drive (ODD) in electronic apparatus like notebooks and desktop computers. A user may push the functional module in order that the functional module is locked by the lock adjacent to the functional module inside the electronic apparatus. Pushing the functional module at the same way will unlock the lock such that the functional module may be ejected by an elastic component.

Such type of push-push lock, however, needs room for backward stroke of the lock behind the functional module inside the electronic apparatus, which takes up more room from the electronic apparatus and also requires additional complex linkage mechanism. Besides, conventional push-push lock comes with fixed moving stroke that should be determined at early design stage, which means the stroke of a manufactured lock is unchangeable. Once cannot have different stroke implemented in the push-push lock without designing different lock.

SUMMARY OF THE INVENTION

In order to solve the above mentioned problems from the conventional push-push locks, i.e., taking up additional room from the electronic apparatus, requiring extra complex structure, and not sharable between apparatuses with various requirements, embodiments of the application provide a ratchet module and an electronic apparatus having the same.

According to an embodiment of the application, a ratchet module is provided, which includes a first member, a second member, a resilient restoring member, and a release member. The first member includes a first ratchet extending on an axial direction along a rotation center and the second member includes a second ratchet extending on the axial direction and facing the first ratchet. The second ratchet meshes with the first ratchet such that the second member is one-way rotatable around the rotation center with respect to the first member. The resilient restoring member is connected between the first member and the second member and keeps an engaged status between the first member and the second member such that the first ratchet and the second ratchet securely mesh with each other. The resilient restoring member provides a rotation restoring force for the second member when the second member is one-way rotated with respect to the first member. The release member is exerted to push to disengage the second member from the first member such that the second ratchet disengages from the first ratchet.

According to the embodiment, the first ratchet includes a first meshing plane and the second ratchet includes a second meshing plane for meshing with the first meshing plane on the axial direction. The first ratchet includes a plurality of first teeth annularly disposed on the first meshing plane and the second ratchet includes a plurality of second teeth annularly disposed on the second meshing plane. The plurality of first teeth mesh with the plurality of second teeth.

According to the embodiment, the second meshing plane includes a platform upon which the release member is exerted to push such that the second ratchet disengages from the first ratchet.

According to the embodiment, when the release member pushes to disengage the second member from the first member such that the second ratchet disengages from the first ratchet, the resilient restoring member provides an engaging restoring force for the second member toward the first member.

According to the embodiment, the resilient restoring element is a torque spring including a first engaging end and a second engaging end. The first engaging end reaches and engages with a first engaging slot of the first member and the second engaging end reaches and engages with a second engaging slot of the second member.

According to the embodiment, the first member includes a first rotation shaft and the second member includes a second rotation shaft assembled with the first rotation shaft and rotatable with respect to the first rotation shaft. The resilient restoring member is disposed inside the first rotation shaft and the second rotation shaft.

According to the embodiment, the release member is a button including a first protrusion part and a second protrusion part extending along two opposite sides of the first rotation shaft respectively. The button includes a first pressing element and a second pressing element separate from each other. The first protrusion part is disposed on the first pressing element and the second protrusion part is disposed on the second pressing element.

According to another embodiment of the application, an electronic apparatus is provided, which includes a housing, a functional module, and a ratchet module. The housing includes a containing room. The functional module is mounted on the housing and is slidable in the containing room. The ratchet module is disposed within the housing. The ratchet module includes a first member, a second member, a resilient restoring member, and a release member. The first member is mounted on the housing. The first member includes a first ratchet extending on an axial direction along a rotation center and the second member includes a second ratchet extending on the axial direction and facing the first ratchet. The second ratchet meshes with the first ratchet such that the second member is one-way rotatable around the rotation center with respect to the first member. The resilient restoring member is connected between the first member and the second member and keeps an engaged status between the first member and the second member such that the first ratchet and the second ratchet securely mesh with each other. The resilient restoring member provides a rotation restoring force for the second member when the second member is one-way rotated with respect to the first member. The release member is exerted to push to disengage the second member from the first member such that the second ratchet disengages from the first ratchet. The functional module moves the second member to rotate with respect to the first member when the functional module slides in the containing room.

According to the embodiment, the first ratchet includes a first meshing plane and the second ratchet includes a second meshing plane for meshing with the first meshing plane on the axial direction. The first ratchet includes a plurality of first teeth annularly disposed on the first meshing plane and the second ratchet includes a plurality of second teeth annularly disposed on the second meshing plane. The plurality of first teeth mesh with the plurality of second teeth.

According to the embodiment, the second meshing plane includes a platform upon which the release member is exerted to push such that the second ratchet disengages from the first ratchet.

According to the embodiment, when the release member pushes to disengage the second member from the first member such that the second ratchet disengages from the first ratchet, the resilient restoring member provides an engaging restoring force for the second member toward the first member.

According to the embodiment, the resilient restoring element is a torque spring including a first engaging end and a second engaging end. The first engaging end reaches and engages with a first engaging slot of the first member and the second engaging end reaches and engages with a second engaging slot of the second member.

According to the embodiment, the first member includes a first rotation shaft and the second member includes a second rotation shaft assembled with the first rotation shaft and rotatable with respect to the first rotation shaft. The resilient restoring member is disposed inside the first rotation shaft and the second rotation shaft. The release member is a button including a first protrusion part and a second protrusion part extending along two opposite sides of the first rotation shaft respectively. The button includes a first pressing element and a second pressing element separate from each other. The first protrusion part is disposed on the first pressing element and the second protrusion part is disposed on the second pressing element.

According to the embodiment, the functional module includes a pushing part, the second member includes an extending arm with a protrusion formed thereon, and when the functional module slides in the containing room, the pushing part pushes the protrusion of the second member at a first position of the containing room such that the second member is one-way rotated with respect to the first member.

According to the embodiment, the pushing part includes a hook for engaging with the protrusion and maintaining the functional module at a second position of the containing room when the functional module moves the second member to one-way rotate with respect to the first member and slides in the containing room to the second position.

According to the embodiment, when the release member pushes the second member such that the second ratchet disengages from the first ratchet, the resilient restoring member moves the second member to rotate reversely with respect to the first member and the protrusion of the second member pushes the pushing part such that the functional module is moved to the first position.

In the embodiments of the application, the ratchet module is disposed in the electronic apparatus to realize one-way push-push function for the functional module. The ratchet module has the first member and the second member meshed with each other with axially extending ratchets such that the second member may be pushed to rotate in one direction with respect to the first member. The torque spring is further disposed between the two members for being twisted to accumulate the restoring force as the second member is moved by the functional module sliding in the housing and rotated with respect to the first member. The second member is also served to maintain the position of the functional module. The button is further used in the ratchet module to push the second member to disengage from the first member, allowing the twisted torque spring to rotate the second member automatically in a reverse direction that can push the functional module to slide reversely in the housing and eject out of the housing. The axially meshing ratchet structure comes with a stability of such push-push component, in the annular meshing way, without occupying much of the room in the housing With The plurality of teeth meshing up in the ratchet module, the application provides multiple retaining strokes for the functional module, reduces the complexity of designing the mechanism, and takes up no additional space for the stroke at the back end. The degree of rotation of the ratchet is adaptive to the need of retaining the product at various positions or angles so as to cut down on the cost and make the module shareable.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
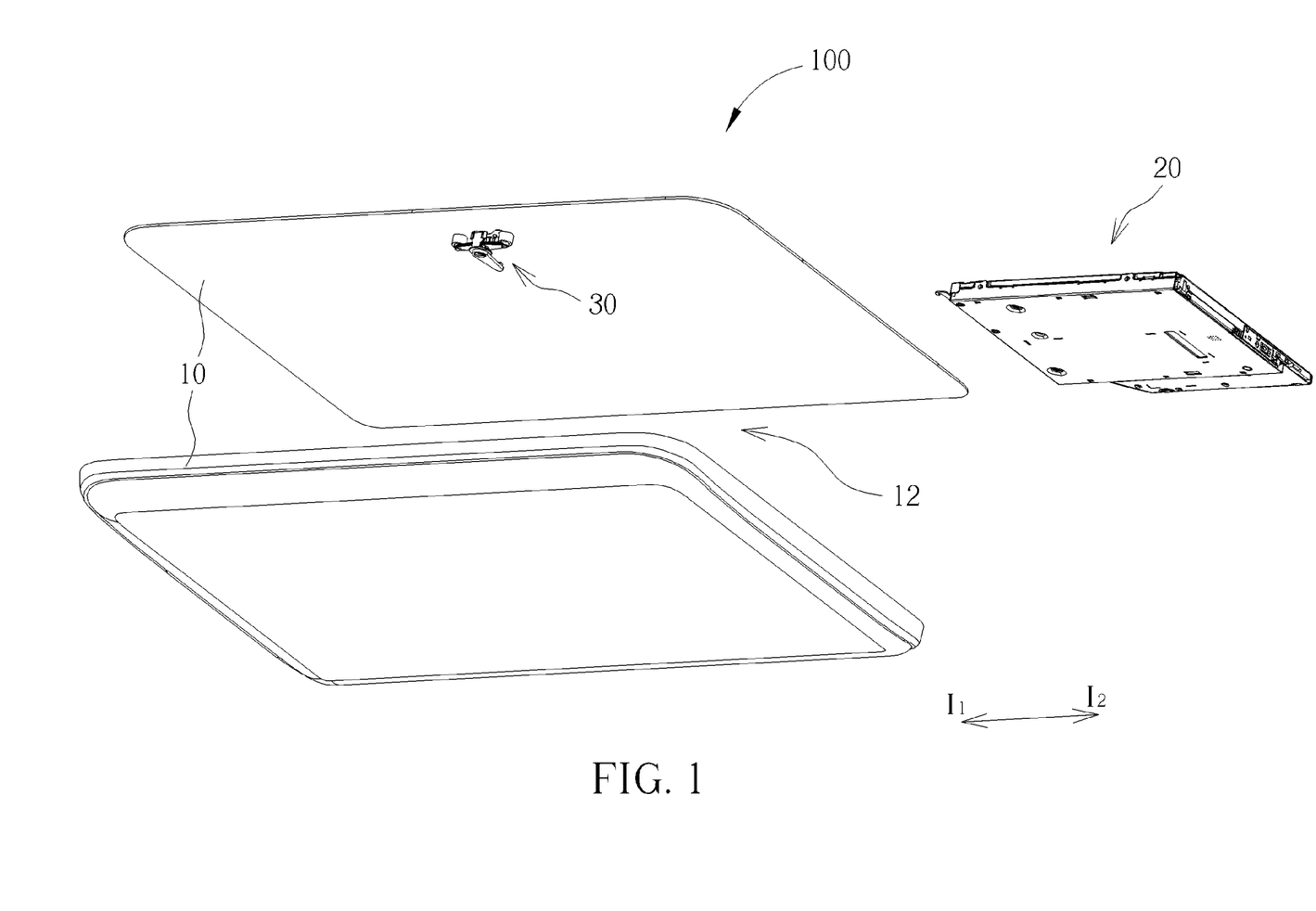
FIG. 1 is an illustration of an electronic apparatus according to an embodiment of the application.

Please refer to FIG. 1. FIG. 1 is an illustration of an electronic apparatus 100 according to an embodiment of the application. The electronic apparatus 100 is illustrated as a notebook, whereas apparatus like a desktop computer or an all-in-one computer may also be an implementation of the electronic apparatus 100. The electronic apparatus 100 includes a housing 10 and a functional module 20. Other necessary but not directly related components of the electronic apparatus 100 are omitted in the figures and description for brevity purpose. The functional module 20 may be an optical disk drive (ODD), a hard disk drive (HDD), or any device that is mountable on the housing 10, either hot swappable or not, and is adapted for providing specific function for the electronic apparatus 100. The housing 10 in FIG. 1 is illustrated with separate components and a containing room 12 exists within the housing 10. The functional module 20 is slidable along direction $I_1I_2$ within the containing room 12 and may be mounted on the housing 10 in the containing room 12 along direction $I_1$. A ratchet module 30 is implemented to accomplish the maintaining and ejection of the functional module 20.

Figure 2:
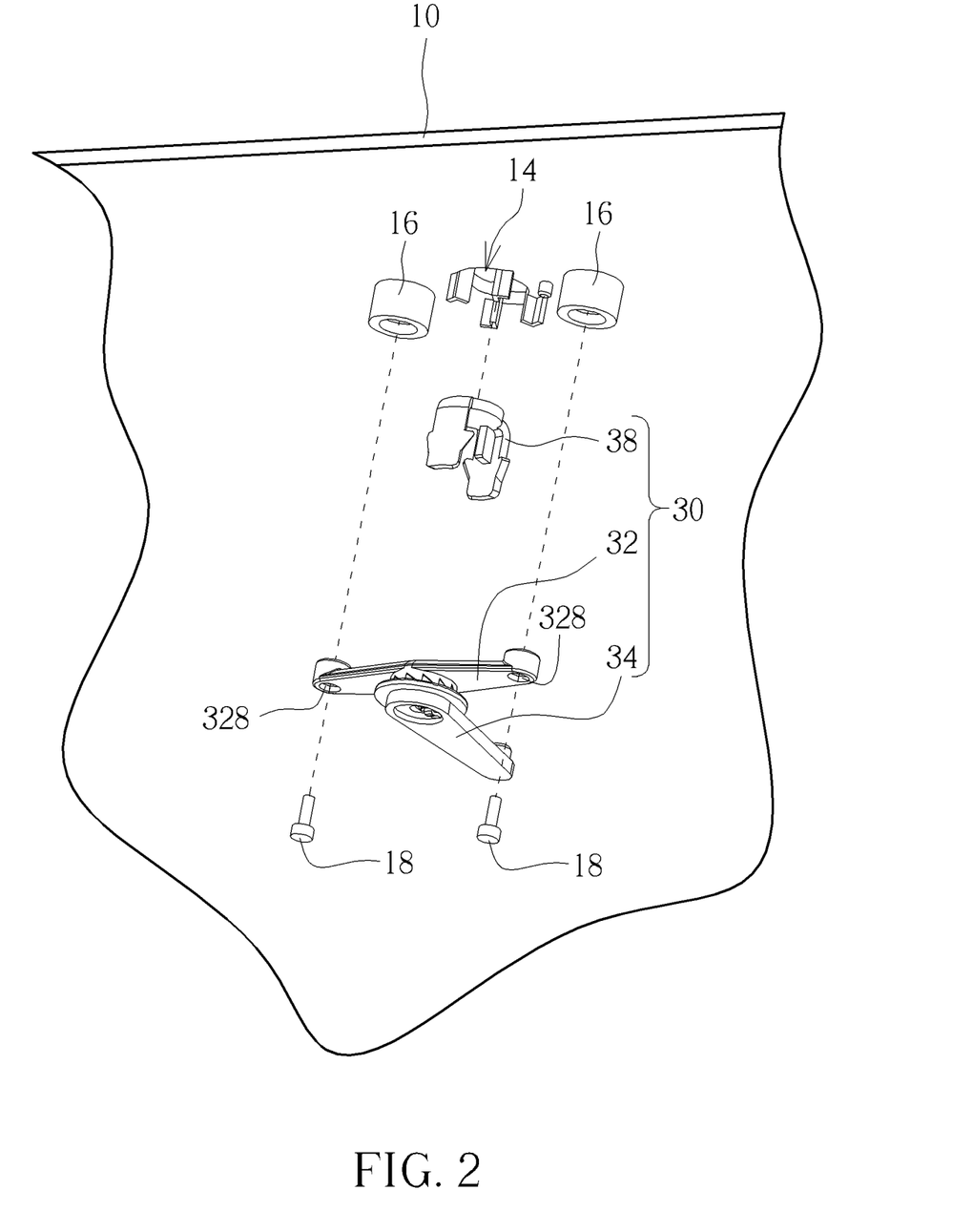
FIG. 2 is an illustration showing a ratchet module and the housing of the electronic apparatus in FIG. 1 in an exploded view.

Please refer to FIG. 2. FIG. 2 is an illustration showing the ratchet module 30 and the housing 10 of the electronic apparatus 100 in FIG. 1 in an exploded view. The ratchet module 30 is disposed within the housing 10 and more specifically, mounted on fixing parts 16 by using screws 18 screwing through holes 328 of the ratchet module 30. The housing 10 has a corresponding opening 14 providing room for a release member, the button 38 in FIG. 2 being an embodiment of such release member, to come out.

Figure 3:
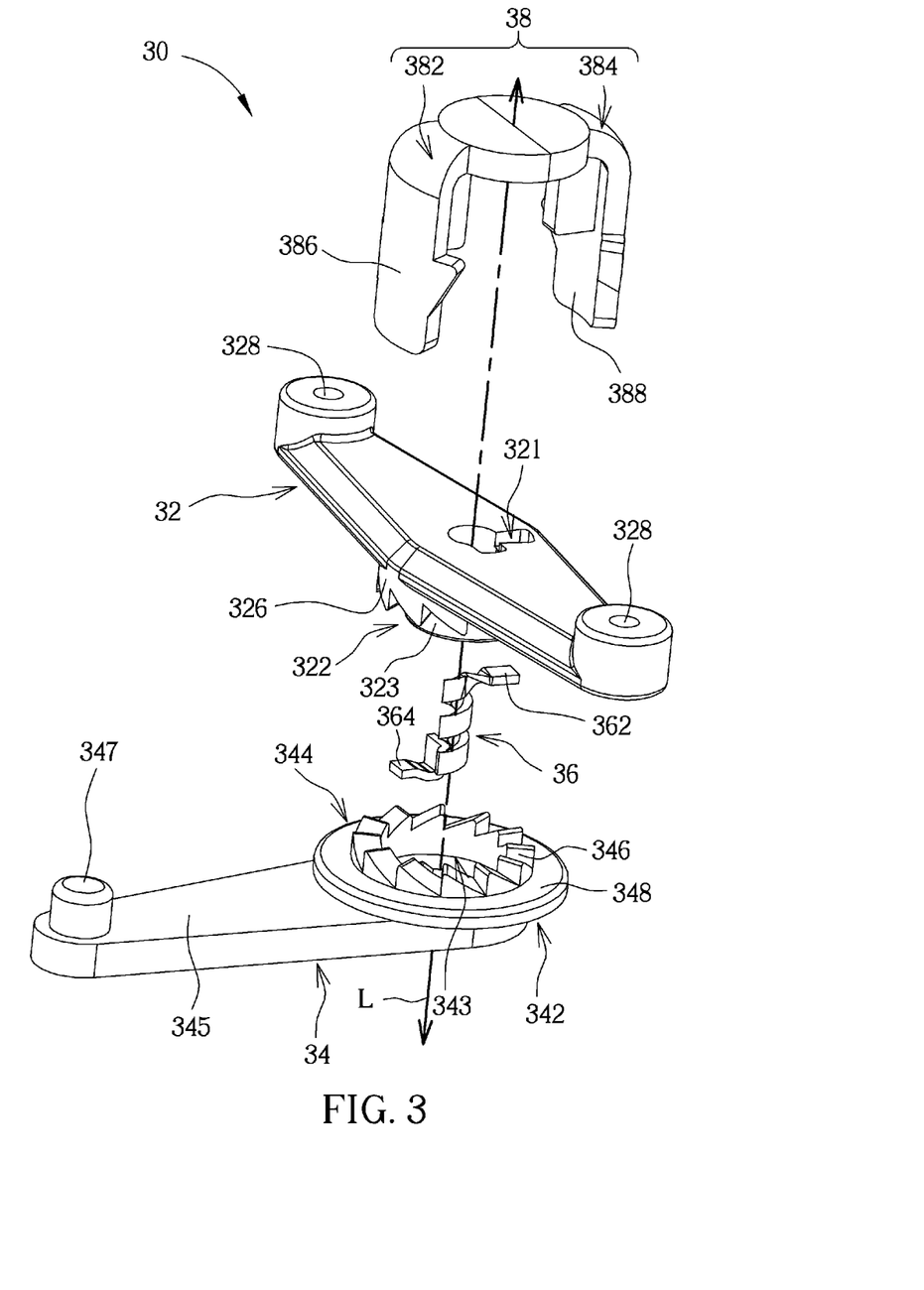
FIG. 3 is an illustration showing an exploded view of an embodiment of the ratchet module according to the invention.
Figure 4:
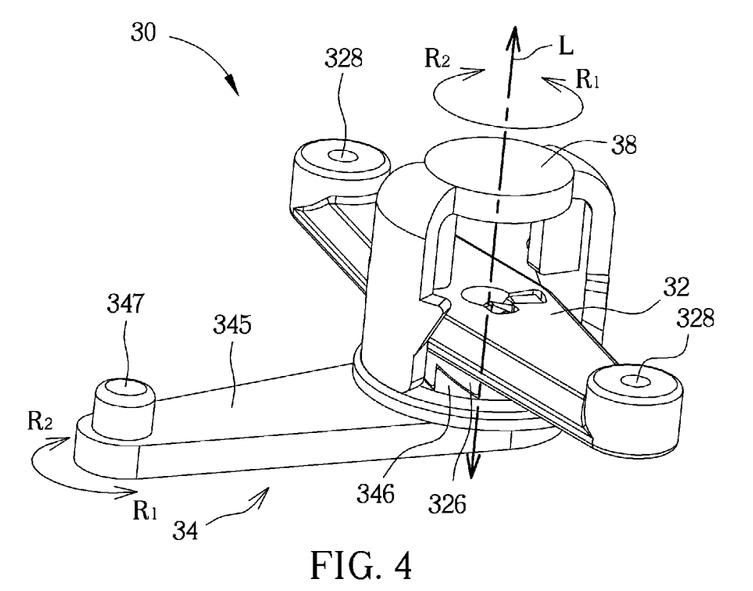
FIG. 4 is an illustration of the ratchet module in FIG. 3 in an assembled view.
Figure 5:
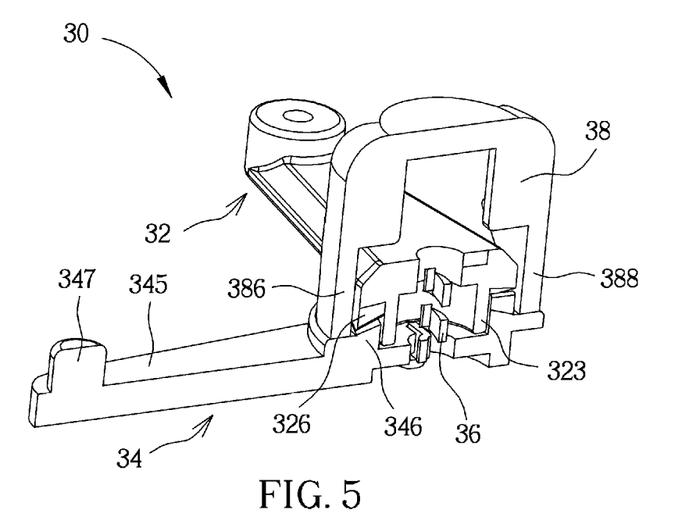
FIG. 5 is an illustration showing partial sectional view of the ratchet module in FIG. 4.
Figure 6:
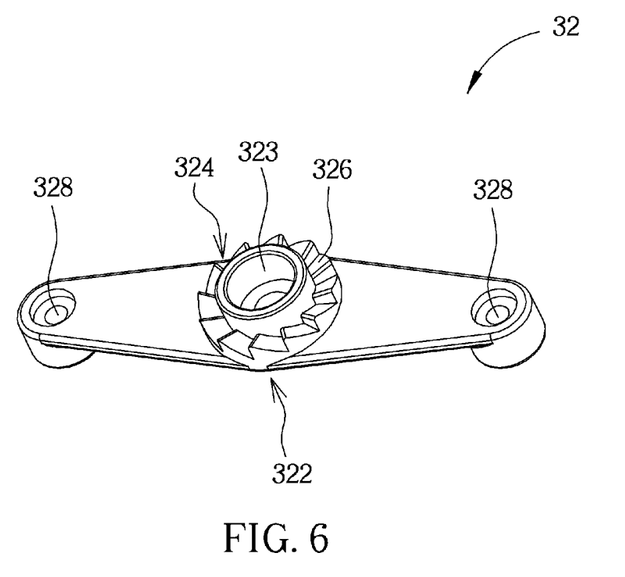
FIG. 6 is an illustration showing another view angle of a first member of the ratchet module.
Figure 7:
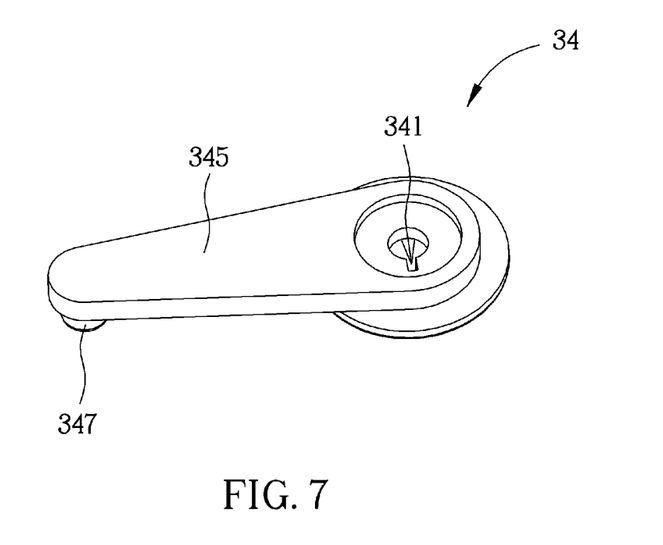
FIG. 7 is an illustration showing another view angle of a second member of the ratchet module.

Please refer to FIG. 3 to FIG. 7. FIG. 3 is an illustration showing an exploded view of an embodiment of the ratchet module according to the invention, FIG. 4 is an illustration of the ratchet module in FIG. 3 in an assembled view, FIG. 5 is an illustration showing partial sectional view of the ratchet module in FIG. 4, FIG. 6 is an illustration showing another view angle of a first member of the ratchet module, and FIG. 7 is an illustration showing another view angle of a second member of the ratchet module. The ratchet module 30 includes a first member 32, a second member 34, a resilient restoring member, the torque spring 36 in FIG. 6 being an example of the resilient restoring member, and the button 38 aforementioned. The holes 328 are disposed on the first member 32, which means the first member 32 is mounted and fixed on the housing 10. The second member 34 is assembled with the first member 32 and is rotatable axially with respect to the first member 32, thereby defining a common rotation center of the first member 32 and the second member 34.

The first member 32 has a first rotation shaft 323 extending along the rotation center and the second member 34 has a second rotation shaft 343 extending along the rotation center. In this embodiment, the first rotation shaft 323 is a sleeve structure sleeved on the second rotation shaft 342, which is in the form of an opening, in such a way that the first rotation shaft 323 and the second rotation shaft 343 maybe assembled together. In other embodiments, the forms of the two rotations shafts may be alternated.

Please refer to FIG. 3. A first ratchet 322 (also referring to FIG. 6) extending on an axial direction L along the rotation center is formed around the first rotation shaft 323 of the first member 32 and faces the second member 34, whereas a second ratchet 342 extending on an axial direction L along the rotation center is formed around the second rotation shaft 343 of the second member 34 and faces the first member 32. The first ratchet 322 and the second ratchet 342 are provided to be selectively meshed with each other or disengaged from each other. More specifically, the first ratchet 322 includes a first meshing plane 324 with a plurality of first teeth 326 annularly disposed thereon and the second ratchet 342 includes a second meshing plane 344 with a plurality of second teeth 346 annularly disposed thereon. The plurality of first teeth 326 meshes with the plurality of second teeth 346 in such a way that the second meshing plane 344 meshes with the first meshing plane 324 along the axial direction L, or equivalently, the first ratchet 322 meshes with the second ratchet 342.

With the meshing relation between the first ratchet 322 of the first member 32 and the second ratchet 342 of the second member 34 and that the first member 32 is mounted and fixed on the housing 10, the second member 34 is one-way rotatable around the axial direction L with respect to the first member 32, i.e., the second member 34 is rotatable with respect to the first member 32 along direction $R_1$ and not rotatable along direction $R_2$. In such way, the ratchet module 30 can only be moved to rotate in one direction when it's in the meshed status.

Please refer to FIG. 3 and FIG. 5. The torque spring 36 is disposed inside and between the first rotation shaft 323 and the second rotation shaft 343 and has a first engaging end 362 and a second engaging end 364, which are preferably implemented in the form of clamping pieces or reverse hooks. The first engaging end 362 reaches and engages with a first engaging slot 321 of the first member 32 and the second engaging end 364 reaches and engages with a second engaging slot 341 of the second member 34 as shown in FIG. 7. Hence, the torque spring 36, on one hand, connects the first member 32 and the second member 34 in such a way that keeps the first member 32 and the second member 34 in an engaged status and, on the other hand, the torque spring 36 curls along the axial direction L so that a rotation restoring force is provided to the second member 34 toward the first member 32. When the second member 34 is exerted to rotate one-way with respect to the first member 32 along direction $R_1$, the torque spring 36 will be further twisted by the second member 34 and the rotation restoring force, which will move the second member 34 to rotate backward along direction $R_2$ with respect to the first member 32, is accumulated.

Please refer to FIG. 3-5. As previously described, the release member of the application may be implemented with a button 38, which is the component of the ratchet module 30 that exposes from the housing 10. The button 38 is disposed on the first member 32 and extends out of the housing 10. The button 38 is also adapted to push to disengage the second member 34 from the first member 32 along the axial direction L when exerted with force such that the second ratchet 342 of the second member 34 disengages from the first ratchet 322 of the first member 32. When the second ratchet 342 no longer meshes with the first ratchet 322, the rotation restoring force of the twisted torque spring 36 moves the second member 34 to rotate reversely with respect to the first member 32 along direction $R_2$.

More specifically, the button 38 includes a first protrusion part 386 and a second protrusion part 388 extending along two opposite sides of the first rotation shaft 323 respectively and pushing against a platform 348 of the second meshing plane 344 of the second member 34. The platform 348 is a circular contact plane around the plurality of second teeth 346. As the button 38 is pressed from outside the housing 10, the first protrusion part 386 and the second protrusion part 388 then push against the platform 348 and force the second ratchet 342 to disengage from the first ratchet 322.

It should be noted that since the torque spring 36 is a resilient member curling along the axial direction L, the torque spring 36 will be stretched by the second member 34 when the second member 34 is pushed by the button 38 and moves away from the first member 32 downward along the axial direction L as shown in FIG. 4. At such status, an engaging restoring force is also provided by the torque spring 36 to the second member 34 toward the first member 32. When the button 36 no longer pushes the second member 34, the engaging restoring force of the torque spring 36 automatically moves the second member 34 back to the engagement with the first member 32 upward along the axial direction L.

In this embodiment, the resilient restoring member in the form of the torque spring 36 serves two purposes of pulling together the first member 32 and the second member 34 and providing resilient torque and rotation restoring force for the second member 34 with respect to the first member 32. In other embodiments, however, these two functions may be accomplished by two separate components. For example, the resilient restoring member may include a torque spring and a stretching elastic component, the torque spring providing resilient torque and rotation restoring force for the second member 34 with respect to the first member 32 while the stretching elastic component connected to the first member 32 and the second member 34 with its two ends and serving to pull together the first member 32 and the second member 34 and allowing slight separation and restoring of the first member 32 and the second member 34 under the press of the button 38.

Additionally, the button 38 of the embodiment maybe a unitary component with the first protrusion part 386 and the second protrusion part 388 extending along two opposites sides of the first rotation shaft 323 that push the second member 34 at the same time when the button 38 is pressed. The button 38 may also be in the form of an embodiment as shown in FIG. 3 that includes two separate components: a first pressing element 382 and a second pressing element 384. The first protrusion part 386 belongs to the first pressing element 382 and the second protrusion part 388 belongs to the second pressing element 384. Such embodiment allows independent movement of one of the first protrusion part 386 and the second protrusion part 388 in such a way that the second member 34 will be partially pushed when only one pressing element is pressed. This ensures the second ratchet 342 will completely disengage from the first ratchet 322 only when the first pressing element 382 and the second pressing element 384 of the button 38 are pressed at the same time. Accidentally pressing the button 38 will not disengage the second member 34 from the first member 32 and the torque spring 36 will not rotate the second member 34.

Figure 8:
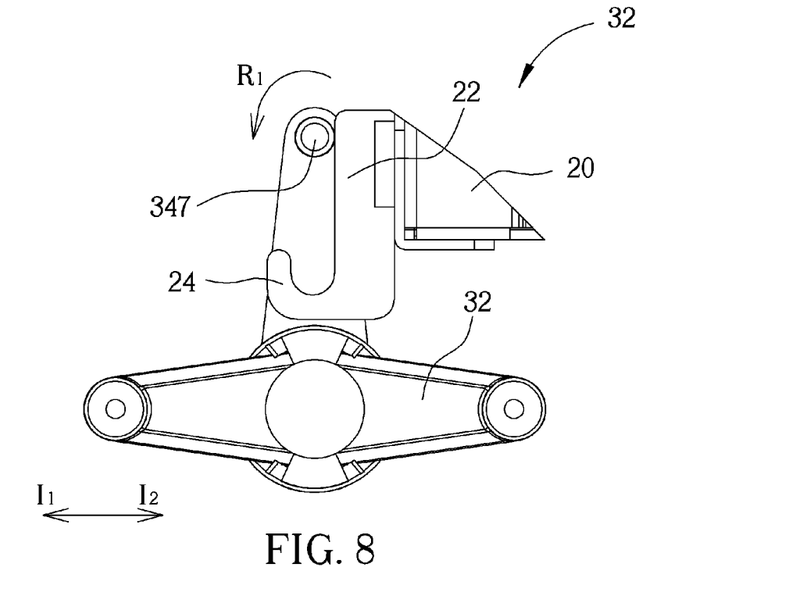
FIG. 8 is an illustration of a functional module of the electronic apparatus pushing the ratchet module at a first position.
Figure 9:
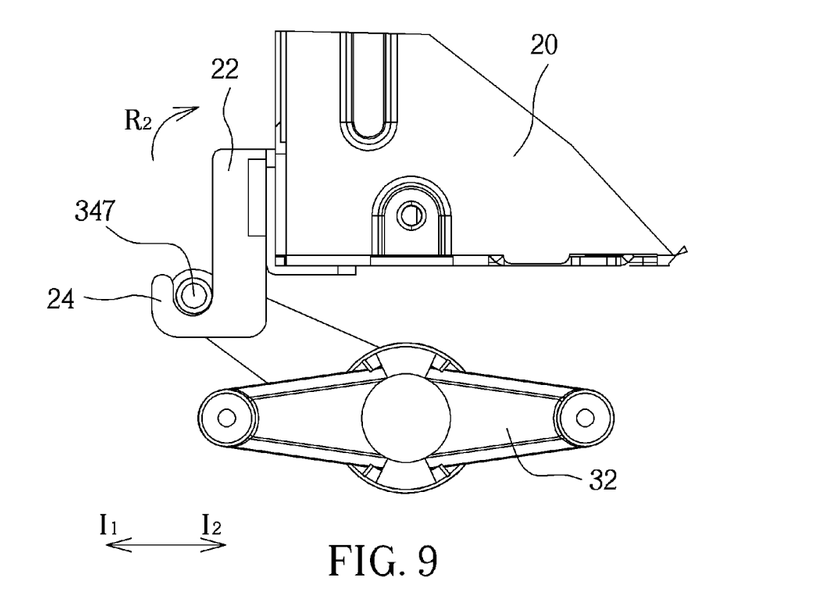
FIG. 9 is an illustration of the functional module of the electronic apparatus pushing the ratchet module to a second position and maintained by the ratchet module.

Please refer to FIG. 8 and FIG. 9. FIG. 8 is an illustration of a functional module of the electronic apparatus pushing the ratchet module at a first position and FIG. 9 is an illustration of the functional module of the electronic apparatus pushing the ratchet module to a second position and maintained by the ratchet module. The ratchet module 30 aforementioned is served to provide the push-push function for the functional module of the electronic apparatus 100.

Please also refer to FIG. 4. In FIG. 4 and FIG. 8, the functional module 20 includes a pushing part 22 that has a hook 24. The second member 34, as a component activated by the functional module 20, includes an extending arm 345 where a protrusion 347 is formed thereon and extending along the axial direction L. As the functional module 20 moves in the containing room 12 along direction $L_1$ to a first position as shown in FIG. 8, the pushing part 22 goes on to push the protrusion 347 on the second member 34 and moves the second member 34 to rotate along direction $R_1$ with respect to the first member 32 all the way until the functional module 20 slides to a second position as shown in FIG. 9. Please recall that the second member 34 is one-way rotatable along direction $R_1$ with respect to the first member 32 and not rotatable along direction $R_2$ with respect to the first member 32 when the second member 34 is engaged with the first member 32. At the second position in FIG. 9, the hook 24 engages with the protrusion 347 such that the second member 34 of the ratchet module 30 may limit the movement of the hook 24, thereby maintaining the functional module 20 at the second position.

To release the ratchet module 30, simply pressing the button 38, or the two independent pressing parts of the buttons 38, pushes to disengage the second member 34 from the first member 32. At such moment, the rotation restoring force of the torque spring 36 automatically moves the second member 34 to rotate reversely along direction $R_2$, whereas the protrusion 347 of the second member 34 pushes the pushing part 22 of the functional module 20 such the functional module 20 slides out of the housing 10 along direction $l_2$ all the way to the first position as shown in FIG. 8 or even farther outward.

In the embodiments of the application, the ratchet module is disposed in the electronic apparatus to realize one-way push-push function for the functional module. The ratchet module includes the first member and the second member meshed with each other with axially extending ratchets such that the second member may be pushed to rotate in one direction with respect to the first member. The torque spring is further disposed between the two members for being twisted to accumulate the restoring force as the second member is moved by the functional module sliding in the housing and rotated with respect to the first member. The second member is also served to maintain the position of the functional module. The button is further used in the ratchet module to push the second member to disengage from the first member, allowing the twisted torque spring to rotate the second member automatically in a reverse direction that can push the functional module to slide reversely in the housing.

The embodiments of the application utilize the ratchet module to accomplish the insertion and ejection of the functional module in an electronic apparatus. With The plurality of teeth meshing up in the ratchet module, the application provides multiple retaining strokes for the functional module, reduces the complexity of designing the mechanism, and takes up no additional space for the stroke at the back end. The degree of rotation of the ratchet is adaptive to the need of retaining the product at various positions or angles so as to cut down on the cost and make the module shareable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A ratchet module, comprising:
a first member comprising a first ratchet extending on an axial direction along a rotation center;
a second member comprising a second ratchet extending on the axial direction and facing the first ratchet, the second ratchet meshing with the first ratchet such that the second member is one-way rotatable around the rotation center with respect to the first member;
a resilient restoring member connected between the first member and the second member and keeping an engaged status between the first member and the second member such that the first ratchet and the second ratchet securely mesh with each other, the resilient restoring member providing a rotation restoring force for the second member when the second member is one-way rotated with respect to the first member; and
a release member for being exerted to push to disengage the second member from the first member such that the second ratchet disengages from the first ratchet.

2. The ratchet module of claim 1, wherein the first ratchet comprises a first meshing plane and the second ratchet comprises a second meshing plane for meshing with the first meshing plane on the axial direction.

3. The ratchet module of claim 2, wherein the first ratchet comprises a plurality of first teeth annularly disposed on the first meshing plane, the second ratchet comprises a plurality of second teeth annularly disposed on the second meshing plane, and the plurality of first teeth mesh with the plurality of second teeth.

4. The ratchet module of claim 2, wherein the second meshing plane comprises a platform upon which the release member is exerted to push such that the second ratchet disengages from the first ratchet.

5. The ratchet module of claim 1, wherein when the release member pushes to disengage the second member from the first member such that the second ratchet disengages from the first ratchet, the resilient restoring member provides an engaging restoring force for the second member toward the first member.

6. The ratchet module of claim 1, wherein the resilient restoring element is a torque spring comprising a first engaging end and a second engaging end, the first engaging end reaching and engaging with a first engaging slot of the first member and the second engaging end reaching and engaging with a second engaging slot of the second member.

7. The ratchet module of claim 1, wherein the first member comprises a first rotation shaft and the second member comprises a second rotation shaft assembled with the first rotation shaft and rotatable with respect to the first rotation shaft.

8. The ratchet module of claim 7, wherein the resilient restoring member is disposed inside the first rotation shaft and the second rotation shaft.

9. The ratchet module of claim 7, wherein the release member is a button comprising a first protrusion part and a second protrusion part extending along two opposite sides of the first rotation shaft respectively.

10. The ratchet module of claim 9, wherein the button comprises a first pressing element and a second pressing element separate from each other, the first protrusion part disposed on the first pressing element and the second protrusion part disposed on the second pressing element.

11. An electronic apparatus comprising:
a housing having a containing room;
a functional module mounted on the housing and slidable in the containing room; and
a ratchet module disposed within the housing, the ratchet module comprising:
a first member mounted on the housing, the first member comprising a first ratchet extending on an axial direction along a rotation center;
a second member comprising a second ratchet extending on the axial direction and facing the first ratchet, the second ratchet meshing with the first ratchet such that the second member is one-way rotatable around the rotation center with respect to the first member;
a resilient restoring member connected between the first member and the second member and keeping an engaged status between the first member and the second member such that the first ratchet and the second ratchet securely mesh with each other, the resilient restoring member providing a rotation restoring force for the second member when the second member is one-way rotated with respect to the first member; and
a release member for being exerted to push to disengage the second member from the first member such that the second ratchet disengages from the first ratchet;
wherein the functional module moves the second member to rotate with respect to the first member when the functional module slides in the containing room.

12. The electronic apparatus of claim 11, wherein the first ratchet comprises a first meshing plane and the second ratchet comprises a second meshing plane for meshing with the first meshing plane on the axial direction.

13. The electronic apparatus of claim 12, wherein the first ratchet comprises a plurality of first teeth annularly disposed on the first meshing plane, the second ratchet comprises a plurality of second teeth annularly disposed on the second meshing plane, and the plurality of first teeth mesh with the plurality of second teeth.

14. The electronic apparatus of claim 12, wherein the second meshing plane comprises a platform upon which the release member is exerted to push such that the second ratchet disengages from the first ratchet.

15. The electronic apparatus of claim 11, wherein when the release member pushes to disengage the second member from the first member such that the second ratchet disengages from the first ratchet, the resilient restoring member provides an engaging restoring force for the second member toward the first member.

16. The electronic apparatus of claim 11, wherein the resilient restoring element is a torque spring comprising a first engaging end and a second engaging end, the first engaging end reaching and engaging with a first engaging slot of the first member and the second engaging end reaching and engaging with a second engaging slot of the second member.

17. The electronic apparatus of claim 11, wherein the first member comprises a first rotation shaft, the second member comprising a second rotation shaft assembled with the first rotation shaft and rotatable with respect to the first rotation shaft, the resilient restoring member disposed inside the first rotation shaft and the second rotation shaft.

18. The electronic apparatus of claim 17, wherein the release member is a button comprising a first protrusion part and a second protrusion part extending along two opposite sides of the first rotation shaft respectively.

19. The electronic apparatus of claim 18, wherein the button comprises a first pressing element and a second pressing element separate from each other, the first protrusion part disposed on the first pressing element and the second protrusion part disposed on the second pressing element.

20. The electronic apparatus of claim 11, wherein the functional module comprises a pushing part, the second member comprises an extending arm with a protrusion formed thereon, and when the functional module slides in the containing room, the pushing part pushes the protrusion of the second member at a first position of the containing room such that the second member is one-way rotated with respect to the first member.

21. The electronic apparatus of claim 20, wherein the pushing part comprises a hook for engaging with the protrusion and maintaining the functional module at a second position of the containing room when the functional module moves the second member to one-way rotate with respect to the first member and slides in the containing room to the second position.

22. The electronic apparatus of claim 21, wherein when the release member pushes the second member such that the second ratchet disengages from the first ratchet, the resilient restoring member moves the second member to rotate reversely with respect to the first member and the protrusion of the second member pushes the pushing part such that the functional module is moved to the first position.

* * * * *